United States Patent
Wu et al.

(10) Patent No.: US 12,230,763 B2
(45) Date of Patent: Feb. 18, 2025

(54) SECONDARY BATTERY AND DEVICE COMPRISING THE SAME

(71) Applicant: CONTEMPORARY AMPEREX TECHNOLOGY (HONG KONG) LIMITED, Hong Kong (CN)

(72) Inventors: Zeli Wu, Ningde (CN); Changlong Han, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 532 days.

(21) Appl. No.: 17/510,696

(22) Filed: Oct. 26, 2021

(65) Prior Publication Data
US 2022/0045365 A1 Feb. 10, 2022

Related U.S. Application Data

(63) Continuation of application No. PCT/CN2019/127983, filed on Dec. 24, 2019.

(51) Int. Cl.
*H01M 10/0569* (2010.01)
*H01M 4/38* (2006.01)
(Continued)

(52) U.S. Cl.
CPC ....... *H01M 10/0569* (2013.01); *H01M 4/386* (2013.01); *H01M 4/505* (2013.01);
(Continued)

(58) Field of Classification Search
CPC ......... H01M 10/0569; H01M 10/0567; H01M 4/386; H01M 4/505; H01M 4/525;
(Continued)

(56) References Cited

U.S. PATENT DOCUMENTS 8,980,483 B2   3/2015   Ihara et al.
2010/0190065 A1*  7/2010   Ihara ................ H01M 4/525
                                                         429/340

(Continued)

FOREIGN PATENT DOCUMENTS

CN    101789520 A    7/2010
CN    101814626 A    8/2010
(Continued)

OTHER PUBLICATIONS

CN109244530A translation (Year: 2019).*
(Continued)

*Primary Examiner* — Jane J Rhee
(74) *Attorney, Agent, or Firm* — Ladas & Parry LLP (57) ABSTRACT

The application provides a secondary battery and a device including the same. The secondary battery includes a negative electrode plate that includes a negative electrode film, where the negative electrode film includes a negative electrode active material; electrolyte that includes an electrolyte salt, an organic solvent and an additive, where the negative electrode active material includes a silicon-based material; the organic solvent includes dimethyl carbonate (DMC); and the additive includes one or more of compound shown in Formula 1 as discloses in the application, where, $R_1$ is selected from one of C2~C4 alkylene or halogenated alkylene, C2~C4 alkenylene or halogenated alkenylene, C6~C18 arylene and derivatives thereof. Under the premise of having a high energy density, the secondary battery and the device including the same according to the application can also have good high-temperature cycle performance and high-temperature storage performance.

15 Claims, 2 Drawing Sheets

(51) Int. Cl.
  *H01M 4/505*      (2010.01)
  *H01M 4/525*      (2010.01)
  *H01M 4/583*      (2010.01)
  *H01M 10/0567*    (2010.01)
  *H01M 4/02*       (2006.01)

(52) U.S. Cl.
  CPC .......... *H01M 4/525* (2013.01); *H01M 4/583* (2013.01); *H01M 10/0567* (2013.01); *H01M 2004/027* (2013.01); *H01M 2004/028* (2013.01); *H01M 2300/0054* (2013.01)

(58) Field of Classification Search
  CPC .......... H01M 4/583; H01M 2004/027; H01M 2004/028; H01M 2300/0054
  See application file for complete search history.

(56) References Cited

U.S. PATENT DOCUMENTS

| | | | |
|---|---|---|---|
| 2010/0221604 A1 | 9/2010 | Wakita et al. | |
| 2013/0093392 A1 | 4/2013 | Odani et al. | |
| 2016/0336614 A1 | 11/2016 | Hatta et al. | |
| 2019/0348667 A1* | 11/2019 | Kang | H01M 4/133 |

FOREIGN PATENT DOCUMENTS

| | | | |
|---|---|---|---|
| CN | 101345326 B | 11/2010 | |
| CN | 102593528 A | 7/2012 | |
| CN | 103066328 A | 4/2013 | |
| CN | 107146911 A | 9/2017 | |
| CN | 107851847 A | 3/2018 | |
| EP | 3333962 A1 | 6/2018 | |
| JP | 2009110798 A | 5/2009 | |
| JP | 2010170886 A | 8/2010 | |
| JP | 2010205436 A | 9/2010 | |
| JP | 2012256502 A | 12/2012 | |
| JP | 2013134859 A | 7/2013 | |
| JP | 2019145322 A | 8/2019 | |
| JP | 2019169564 A | 10/2019 | |
| JP | 2019175712 A | 10/2019 | |
| KR | 10-2000-0067241 A | 11/2000 | |
| KR | 10-2009-0005973 A | 1/2009 | |
| WO | 2017199572 A1 | 11/2017 | |

OTHER PUBLICATIONS

First Examination Report of IN Application No. 202217029235, mailed Sep. 28, 2022, 6 pages.
First Office Action of Chinese patent application No. 201980098815.9, mailed Apr. 19, 2023.
First Office Action of Japanese patent application No. 2022-520578, mailed May 29, 2023.
Wang, Ding et al. High voltage electrolyte additive, Mar. 31, 2019 pp. 212-214.
Wang, Guangjun et al. High temperature performance of lithium-ion batteries based on LiNi0.6Co0.2Mn0.2O2 and LiMn0.8Fe0.2PO4 blended cathode, Power source technologies, No. 3, vol. 42, Mar. 31, 2018, pp. 343-346.
ISR for International Application PCT/CN2019/127983 malled Sep. 17, 2020.
Written Opinion for International Application PCT/CN2019/127983 mailed Sep. 17, 2020.
Extended European Search Report of EP application No. 19957782.6, mailed Feb. 28, 2022.
First Office Action of EP application No. 19957782.6, mailed Jun. 23, 2022.
Korean office action dated Apr. 29, 2024 for Application No. KR 10-2022-7010875.
Chinese Notification of Reexamination for Application No. 201980098815.9, issued Nov. 11, 2024, 7 pages.
Pan, Xiaoyong et al., "New Energy Technology," Jiangxi Universities and Colleges Press, Nov. 2019, pp. 269-271.

* cited by examiner

SECONDARY BATTERY AND DEVICE COMPRISING THE SAME

CROSS-REFERENCE TO RELATED APPLICATION

This application is a continuation of International Patent Application No. PCT/CN2019/127983, filed on Dec. 24, 2019, the entire content of which is incorporated herein by reference.

TECHNICAL FIELD

The application relates to the technical field of batteries, in particular to a secondary battery and a device including the same.

BACKGROUND

Secondary battery, relative to traditional lead-acid battery, Ni-MH battery and Ni—Cd battery, has the advantages of high energy density and long cycle life, and thus has been extensively applied to various fields.

Electric vehicles usually require secondary batteries to feature high energy density and long cycle life when it is in use. At present, silicon-based material has been extensively studied due to its high theoretical gram capacity. However, when the silicon-based material is applied to a negative electrode active material, the secondary battery produced has poor electrochemical performance.

To meet the performance needs of electric vehicles for secondary batteries, it is necessary to provide a secondary battery with good comprehensive performance.

SUMMARY

In view of the problems in the background art, the application provides a secondary battery and a device including the same. The secondary battery can also have good high-temperature cycle performance and high-temperature storage performance under the premise of having a high energy density.

In an attempt to achieve the foregoing purpose, a first aspect of the application provides a secondary battery, comprising a negative electrode plate that comprises a negative electrode film, wherein the negative electrode film comprises a negative electrode active material; electrolyte that comprises an electrolyte salt, an organic solvent and an additive, wherein the negative electrode active material comprises a silicon-based material; the organic solvent comprises dimethyl carbonate (DMC); and the additive comprises one or more of compound shown in Formula 1 below;

Formula 1 where, $R_1$ is selected from one or more of C2~C4 alkylene or halogenated alkylene, C2~C4 alkenylene or halogenated alkenylene, C6~C18 arylene and derivatives thereof.

A second aspect of the application provides a device, comprising the secondary battery according to a first aspect of the application.

The application at least comprises the following beneficial effects:

A secondary battery according to the application, wherein a negative electrode comprises a silicon-based active material, an organic solvent in the electrolyte comprises dimethyl carbonate (DMC), and an additive comprises a compound shown in Formula 1, so that the secondary battery can also have good high-temperature cycle performance and high-temperature storage performance under the premise of having a high energy density. The device according to the application comprises the secondary battery, and thus at least has the same advantages as the secondary battery.

In which, reference signs are as follows:
1 battery pack
2 upper box body
3 lower box body
4 battery module
5 secondary battery

DETAIL DESCRIPTION

A secondary battery and a device including the same according to the application are described in detail below.

The secondary battery according to the application comprises a negative electrode plate and electrolyte, the negative electrode plate comprises a negative electrode current collector and a negative electrode film disposed on at least one surface of the negative electrode current collector and comprising a negative electrode active material, and the negative electrode active material comprises a silicon-based material; the electrolyte comprises an electrolyte salt, an organic solvent and an additive, the organic solvent comprises dimethyl carbonate (DMC), the additive comprises one or more of compound shown in Formula 1, where $R_1$ is selected from one or more of C2~C4 alkylene or halogenated alkylene, C2~C4 alkenylene or halogenated alkenylene, C6~C18 arylene and derivatives thereof;

Formula 1

In a secondary battery according to a first aspect of the application, a silicon-based material has a high theoretical specific capacity, and thus can significantly increase the capacity of the secondary battery when it is applied as the negative electrode active material. However, the silicon-based material seriously swells during charging and discharging, which leads to the reduction of a porosity of the negative electrode film, and thus affects the performance of the secondary battery. The inventors have discovered that a compact and uniform passivating membrane can be formed by the additive shown in Formula 1 on a surface of the silicon-based material, which can effectively prevent an electrolyte solvent from directly contacting the silicon-based material, reduce a side reaction of the electrolyte solvent on a negative electrode surface, and thus reduce gas production from the secondary battery and improve high-temperature storage performance of the secondary battery. Nevertheless, the passivating membrane formed by the additive shown in Formula 1 on the negative electrode surface has a relatively large membrane forming impedance, which affects the high-temperature cycle performance of the battery. The inventors, through massive researches, have found that, when the DMC included in the organic solvent and the additive shown in Formula 1 are applied simultaneously, the membrane forming impedance of the negative electrode surface can be lowered effectively. Under a synergistic interaction of the aforesaid substances, the secondary battery according to the application can also have good high-temperature cycle performance and high-temperature storage performance under the premise of having a high energy density.

Figure 1:
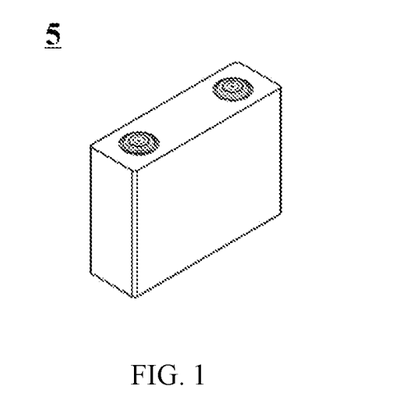
FIG. 1 is a schematic view of one implementation of a secondary battery.

In the secondary battery according to the first aspect of the application, optionally, in the compounds shown in FIG. 1, $R_1$ is selected from one of C2~C4 alkylene or halogenated alkylene, C2~C4 alkenylene or halogenated alkenylene, C6~C18 arylene and derivatives thereof.

In the secondary battery according to the first aspect of the application, more optionally, the compound shown in FIG. 1 is selected from one or more of the following compounds:

Compound 1

Compound 2

Compound 3

Compound 4

In the secondary battery according to the first aspect of the application, optionally, a mass ratio of the compound shown in FIG. 1 in the electrolyte is ≤1%; more optionally, the mass ratio of the compound shown in Formula 1 in the electrolyte is ≤0.8%. When a content of the compound shown in Formula 1 is within the given range, the high-temperature cycle performance of the secondary battery will be further improved.

In the secondary battery according to the first aspect of the application, optionally, a mass ratio of DMC in the organic solvent is ≤20%; more optionally, the mass ratio of DMC in the organic solvent is ≤10%. When a content of DMC is within the given range, the high-temperature storage performance of the secondary battery will be further improved.

In the secondary battery according to the first aspect of the application, optionally, the organic solvent further comprises at least two of ethylene carbonate (EC), ethyl methyl carbonate (EMC) and diethyl carbonate (DEC).

In the secondary battery according to the first aspect of the application, when the organic solvent further comprises EC, optionally, a mass ratio of EC in the organic solvent is ≤15%; more optionally, the mass ratio of EC in the organic solvent is ≤10%. When the mass ratio of EC is within the given range in the organic solvent, the high-temperature storage performance of the battery can be further improved.

In the secondary battery according to the first aspect of the application, when the organic solvent further comprises EMC, optionally, a mass ratio of EMC in the organic solvent is 65%~95%; more optionally, the mass ratio of EMC in the organic solvent is 75%~95%; when the mass ratio of EMC is within the given range in the organic solvent, the high-temperature storage performance of the battery can be further improved.

In the secondary battery according to the first aspect of the application, when the organic solvent further comprises DEC, optionally, a mass ratio of DEC in the organic solvent is ≤30%; more optionally, the mass ratio of DEC in the organic solvent is ≤20%. When the mass ratio of DEC is within the given range in the organic solvent, the high-temperature storage performance of the battery can be further improved as well.

In the secondary battery according to the first aspect of the application, optionally, the additive further comprises one or more of fluoroethylene carbonate (FEC), dioxathiolane 2,2-dioxide (DTD), 1,3-propane sultone (PS), prop-1-ene-1,3-sultone (PST), lithium difluoroborate (LiDFOB), lithium difluorophosphate (LiDFOP), tris(trimethylsilyl) phosphate (TMSP) and tris(trimethylsilyl) borate (TMSB).

In the secondary battery according to the first aspect of the application, the electrolyte salt comprises one or more of $LiPF_6$ and LiFSI; optionally, the electrolyte salt comprises both $LiPF_6$ and LiFSI, and a concentration of the LiFSI is higher than a concentration of the $LiPF_6$ in the electrolyte.

In the secondary battery according to the first aspect of the application, a concentration of the electrolyte salt in the electrolyte is 1.05 mol/L~1.4 mol/L, optionally 1.1 mol/L~1.3 mol/L.

In the secondary battery according to the first aspect of the application, optionally, a conductivity of the electrolyte at 25° C. is 8 mS/cm~10 mS/cm, optionally 8.3 mS/cm~9.0 mS/cm.

In the secondary battery according to the first aspect of the application, optionally, a viscosity of the electrolyte at 25° C. is 3.5 mPa·s~5 mPa·s, optionally 4.0 mPa·s~4.5 mPa·s.

In the secondary battery according to the first aspect of the application, the negative electrode current collector can be selected as actually required without special restrictions on the types thereof. To be specific, the negative electrode current collector can be selected from metal foils, such as copper foils.

In the secondary battery according to the first aspect of the application, optionally, the silicon-based material comprises one or more of monatomic silicon, silicon-carbon composite, silicon oxide compound, silicon nitride compound and silicon alloy; more optionally, the silicon-based material comprises the silicon oxide compound.

In the secondary battery according to the first aspect of the application, optionally, the negative electrode active material further comprises a carbon material, wherein the carbon material comprises one or more of natural graphite, synthetic graphite, hard carbon and soft carbon; more optionally, the carbon material comprises one or more of natural graphite and synthetic graphite.

In the secondary battery according to the first aspect of the application, optionally, a press density of the negative electrode film is 1.6 g/cm³~1.8 g/cm³, more optionally 1.65 g/cm³~1.75 g/cm³.

In the secondary battery according to the first aspect of the application, the secondary battery further comprises a positive electrode plate, wherein the positive electrode plate comprises a positive electrode current collector and a positive electrode film disposed on at least one surface of the positive electrode current collector and comprising a positive electrode active material.

In the secondary battery according to the first aspect of the application, the positive electrode current collector can be selected as actually required without special restrictions on the types thereof. To be specific, the positive electrode current collector can be selected from metal foils, such as aluminum foils.

In the secondary battery according to the first aspect of the application, optionally, the positive electrode active material comprises one or more of lithium-nickel-cobalt-manganese oxides and lithium-nickel-cobalt-aluminum oxides. The lithium-nickel-cobalt-manganese oxides and the lithium-nickel-cobalt-aluminum oxides, as the positive electrode active materials for the secondary battery, have the advantages of high specific capacity and long cycle life, and thus can further improve electrochemical performance of the battery when being used with the negative electrode active material including the silicon-based material.

In the secondary battery according to the first aspect of the application, optionally, the positive electrode active material comprises one or more of $Li_aNi_bCo_cM_dM'_eO_fA_g$ or $Li_aNi_b\text{-}Co_cM_dM'_eO_fA_g$ with a coating layer coated on at least a part of surface of the $Li_aNi_bCo_cM_dM'_eO_fA_g$, wherein $0.8 \le a \le 1.2$, $0.5 \le b < 1$, $0 < c < 1$, $0 < d < 1$, $0 \le e \le 0.1$, $1 \le f \le 2$, and $0 \le g \le 1$, M is selected from one or more of Mn and Al, M' is selected from one or more of Zr, Al, Zn, Cu, Cr, Mg, Fe, V, Ti and B, and A is selected from one or more of N, F, S and Cl.

The coating layer of the positive electrode active material can be carbon layer, oxide layer, inorganic salt layer or conductive polymer layer. The high-temperature cycle performance of the secondary battery can be further improved by means of coating and modifying the surface of the positive electrode active material.

Optionally, the carbon layer may comprise one or more of graphite, graphene, mesocarbon microbead (MCMB), hydrocarbon compound pyrolytic carbon, hard carbon and soft carbon.

Optionally, the oxide layer may comprise one or more of Al oxides, Ti oxides, Mn oxides, Zr oxides, Mg oxides, Zn oxides, Ba oxides, Mo oxides and B oxides.

Optionally, the inorganic salt layer may comprise one or more of $Li_2ZrO_3$, $LiNbO_3$, $Li_4Ti_5O_{12}$, $Li_2TiO_3$, $Li_3VO_4$, $LiSnO_3$, $Li_2SiO_3$ and $LiAlO_2$.

Optionally, the conductive polymer layer may comprise one or more of polypyrrole (PPy), poly(3,4-ethylenedioxythiophene) (PEDOT) and polyamide (PI).

In the secondary battery according to a second aspect of the application, furthermore, the positive electrode active material may comprise one or more of lithium nickel oxides (such as lithium nickelate), lithium manganese oxides (such as spinel lithium manganate and layered lithium manganate), lithium iron phosphate, lithium manganese phosphate, lithium manganese iron phosphate, lithium cobaltate and modified compounds of the aforesaid materials. Materials can be subject to doping modification and/or coating modification by the modified compounds.

In the secondary battery according to the first aspect of the application, the secondary battery further comprises a separating membrane. The separating membrane may be various separating membranes applicable to a lithium ion battery in the art without special restrictions on the types thereof. To be specific, the separating membrane can be selected from one or more of polyethylene membrane, polypropylene membrane, polyvinylidene fluoride membrane and multilayer composite membranes thereof.

In some embodiments, the secondary battery may comprise an outer package used for packaging the positive electrode plate, the negative electrode plate and the electrolyte. As an example, the positive electrode plate, the negative electrode plate and the separating membrane can be laminated or wound to be a laminated electrode assembly or a wound electrode assembly that is packaged in the outer package; and the electrolyte is infiltrated into the electrode assembly. The number of the electrode assemblies in the secondary battery can be one or more, and can be adjusted as needed.

In some embodiments, the outer package of the secondary battery can be a flexible package, for example, a bag type flexible package. The flexible package can be made of plastic that may comprise one or more of polypropylene (PP), polybutylene terephthalate (PBT) and poly(butylene succinate) (PBS). The outer package of the secondary battery can be a hard housing, such as an aluminum housing.

The secondary battery may be of a cylindrical shape, a square shape or any other shapes, without special restrictions on the shape thereof in the application. FIG. 1 shows a secondary battery 5 of a square structure as an example.

In some embodiments, the secondary battery can be assembled into a battery module, and the number of the secondary batteries included in the battery module can be more than one, and the specific number thereof can be adjusted according to applications and capacities of the battery module.

Figure 2:
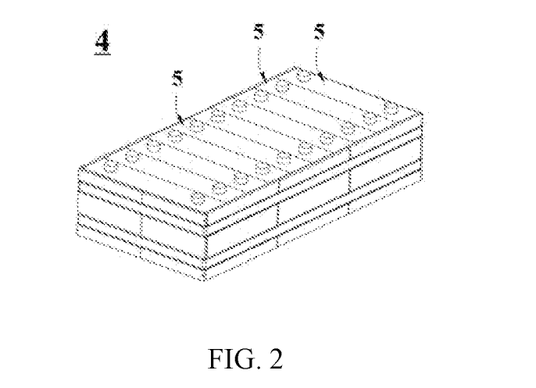
FIG. 2 is a schematic view of one implementation of a battery module.

FIG. 2 shows a battery module 4 as an example. Referring to FIG. 2, in the battery module 4, a plurality of secondary batteries 5 can be disposed in sequence in a length direction of the battery module 4, and can be certainly disposed in any other ways as well. Furthermore, the plurality of secondary batteries 5 can be secured by a fastener.

Optionally, the battery module 4 can further have a housing with a receiving space in which the plurality of batteries 5 are received.

In some embodiments, the battery module can be further assembled into a battery pack. The number of battery modules included in the battery pack can be adjusted according to the applications and capacities of the battery pack.

Figure 3:
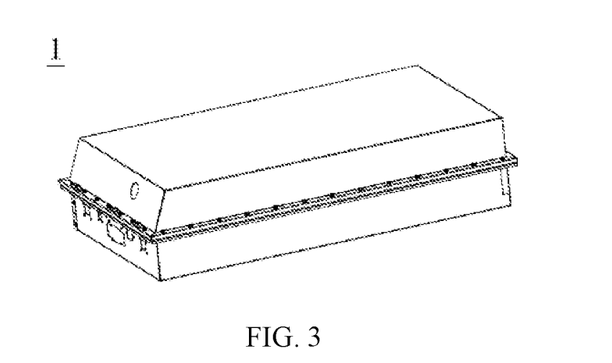
FIG. 3 is a schematic view of one implementation of a battery pack.
Figure 4:
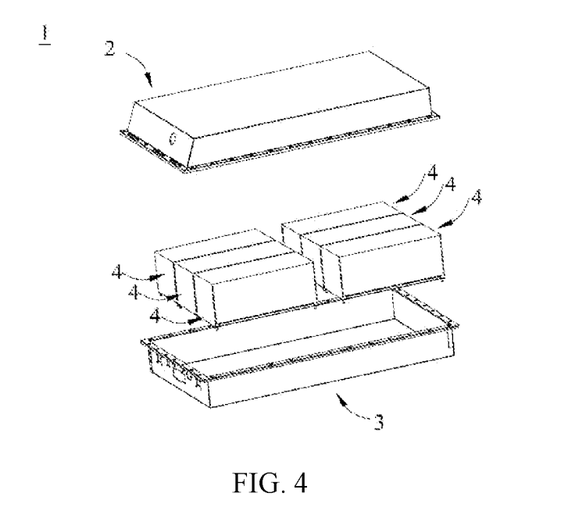
FIG. 4 is an exploded view of FIG. 3.

FIGS. 3 and 4 show a battery pack 1 as an example. Referring to FIGS. 3 and 4, the battery pack 1 may comprise a battery box and a plurality of battery modules 4 in the battery box. The battery box comprises an upper box body 2 and a lower box body 3, wherein the upper box body 2 can cover the lower box body 3, and define an enclosed space configured to receive the battery module 4. The plurality of battery modules 4 can be disposed in the battery box in any way.

The second aspect of the application provides a device, comprising the secondary battery according to the first aspect of the application. The secondary battery can be used as a power supply or an energy storage unit of the device. The device comprises but is not limited to mobile equipment (such as mobile phone and laptop), electric vehicles (such as pure electric vehicle, hybrid electric vehicle, plug-in hybrid electric vehicle, electric bicycle, electric scooter, electric golf vehicle and electric truck), electric trains, ships, satellites and energy storage systems.

The secondary battery, the battery module or the battery pack can be selected for the device according to the use needs thereof.

Figure 5:
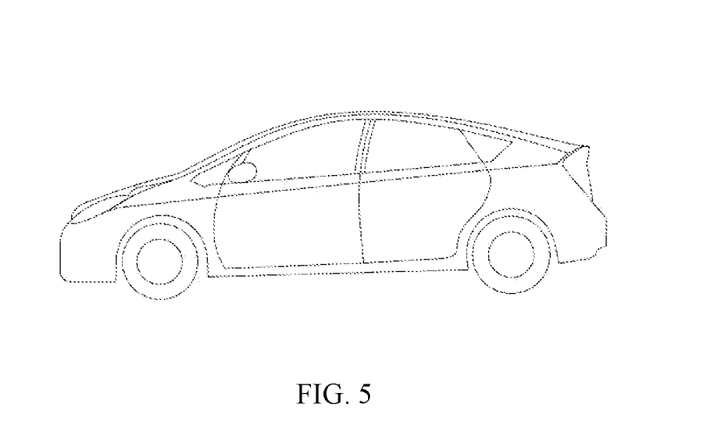
FIG. 5 is a schematic view of one implementation of a device with a secondary battery as a power supply.

FIG. 5 shows a device as an example. The device is a pure electric vehicle, a hybrid electric vehicle or a plug-in hybrid electric vehicle, etc. For the purpose of meeting the demands of the device for high power and high energy density of the secondary battery, the battery pack or the battery module can be applied.

The device, as another example, can be a mobile phone, a tablet PC or a laptop, etc. The secondary battery can be used as the power supply on account that the device is usually required to be light and thin.

The application is further described below with reference to the embodiments. It should be appreciated that these embodiments are merely used for illustrating the application, but are not intended to limit the scope of the application.

It should be noted that the lithium ion secondary battery is merely illustrated in the following embodiments and comparative examples, but the application is not intended to be limited to this.

The secondary battery in embodiments 1-18 and comparative examples 1-5 is prepared according to the following method:

(1) Preparation of Positive Electrode Plate

Mixing a positive electrode active material ($LiNi_{0.8}Co_{0.1}Mn_{0.1}O_2$), a binder polyvinylidene fluoride and a conductive agent acetylene black in a weight ratio of 98:1:1, adding N-methylpyrrolidone (NMP), and stirring till the system is transparent under action of a vacuum mixer, so as to obtain a positive electrode slurry; applying the positive electrode slurry to an aluminum foil uniformly; and transferring the aluminum foil dried at room temperature to an oven for drying, and then performing cold pressing and slitting to obtain a positive electrode plate.

(2) Preparation of Negative Electrode Plate

Mixing a negative electrode active material silicon oxide, after being mixed with a synthetic graphite in a mass ratio of 2:8, with a conductive agent SuperP, a thickener sodium carboxymethylcellulose (CMC-Na) and a binder butadiene styrene rubber (SBR) in a mass ratio of 92:2:2:4, and adding deionized water to obtain a negative electrode slurry under action of a vacuum mixer; applying the negative electrode slurry to a negative electrode current collector copper foil uniformly; and transferring the copper foil to an oven for drying after being dried at room temperature, and then performing cold pressing and slitting to obtain a negative electrode plate.

(3) Preparation of Electrolyte

In an argon glove box with a moisture content of <10 ppm, mixing various organic solvents, dissolving a thoroughly dried electrolyte salt into an organic solvent, and then adding an additive 1 and other additives into the organic solvent, and mixing uniformly to obtain electrolyte, wherein the composition of other additives is 8% FEC+0.5% SA+0.5% TMSP; the component contents of additives are weight percentages calculated by a total weight of the electrolyte; and the component contents of various organic solvents are weight percentages calculated by a total weight of the organic solvent. See table 1 for specific type and concentration of the electrolyte salt, the weight ratios of various organic solvents, and specific type and content of the additive 1.

(4) Preparation of Separating Membrane

Taking a polyethylene membrane as a separating membrane.

(5) Preparation of Secondary Battery:

Folding the positive electrode plate, the separating membrane and the negative electrode plate sequentially, so that the separating membrane separates the positive electrode plate from the negative electrode plate, and then winds to obtain an electrode assembly; and placing the electrode assembly in an outer package, injecting the prepared electrolyte into a dried battery, and obtaining the secondary battery after vacuum package, standing, formation and shaping procedures.

TABLE 1

Parameters of Embodiments 1-18 and Comparative Examples 1-5

| S/N | Organic solvent | Type of electrolyte salt | Concentration of electrolyte salt | Additive 1 | |
|---|---|---|---|---|---|
| Embodiment 1 | EC:EMC:DMC = 10:85:5 | $LiPF_6$ | 1.2 mol/L | Compound 1 | 0.5% |
| Embodiment 2 | EC:EMC:DMC = 10:80:10 | $LiPF_6$ | 1.2 mol/L | Compound 1 | 0.5% |
| Embodiment 3 | EC:EMC:DMC = 10:75:15 | $LiPF_6$ | 1.2 mol/L | Compound 1 | 0.5% |
| Embodiment 4 | EC:EMC:DMC = 10:70:20 | $LiPF_6$ | 1.2 mol/L | Compound 1 | 0.5% |
| Embodiment 5 | EC:EMC:DMC = 5:90:5 | $LiPF_6$ | 1.2 mol/L | Compound 1 | 0.5% |
| Embodiment 6 | EC:EMC:DMC = 5:85:10 | $LiPF_6$ | 1.2 mol/L | Compound 1 | 0.5% |
| Embodiment 7 | EC:EMC:DMC = 5:80:15 | $LiPF_6$ | 1.2 mol/L | Compound 1 | 0.5% |
| Embodiment 8 | EC:EMC:DMC = 5:75:20 | $LiPF_6$ | 1.2 mol/L | Compound 1 | 0.5% |
| Embodiment 9 | EC:EMC:DMC = 5:85:10 | $LiPF_6$ | 1.2 mol/L | Compound 1 | 0.1% |
| Embodiment 10 | EC:EMC:DMC = 5:85:10 | $LiPF_6$ | 1.2 mol/L | Compound 1 | 0.2% |
| Embodiment 11 | EC:EMC:DMC = 5:85:10 | $LiPF_6$ | 1.2 mol/L | Compound 1 | 0.8% |
| Embodiment 12 | EC:EMC:DMC = 5:85:10 | $LiPF_6$ | 1.2 mol/L | Compound 1 | 1% |

TABLE 1-continued

Parameters of Embodiments 1-18 and Comparative Examples 1-5

| S/N | Organic solvent | Type of electrolyte salt | Concentration of electrolyte salt | Additive 1 | |
|---|---|---|---|---|---|
| Embodiment 13 | EC:EMC:DMC = 5:85:10 | $LiPF_6$ | 1.2 mol/L | Compound 2 | 0.5% |
| Embodiment 14 | EC:EMC:DMC = 5:85:10 | $LiPF_6$ | 1.2 mol/L | Compound 3 | 0.5% |
| Embodiment 15 | EC:EMC:DMC = 5:85:10 | $LiPF_6$:LIFSI = 1:5 | 1.1 mol/L | Compound 1 | 0.5% |
| Embodiment 16 | EC:EMC:DMC = 5:85:10 | $LiPF_6$:LIFSI = 1:5 | 1.2 mol/L | Compound 1 | 0.5% |
| Embodiment 17 | EC:EMC:DMC = 5:85:10 | $LiPF_6$:LIFSI = 1:5 | 1.3 mol/L | Compound 1 | 0.5% |
| Embodiment 18 | EC:EMC:DMC = 5:85:10 | $LiPF_6$:LIFSI = 1:5 | 1.4 mol/L | Compound 1 | 0.5% |
| Comparative Example 1 | EC:EMC = 30:70 | $LiPF_6$ | 1.2 mol/L | — | — |
| Comparative Example 2 | EC:EMC = 30:70 | $LiPF_6$ | 1.2 mol/L | Compound 1 | 0.5% |
| Comparative Example 3 | EC:EMC:DMC = 5:85:10 | $LiPF_6$ | 1.2 mol/L | — | — |
| Comparative Example 4 | EC:EMC:DMC = 5:85:10 | $LiPF_6$ | 1.2 mol/L | Compound 1 | 2% |
| Comparative Example 5 | EC:EMC:DMC = 20:50:30 | $LiPF_6$ | 1.2 mol/L | Compound 1 | 0.5% |

Next, the test procedures of the secondary battery will be elaborated.

(1) Storage Performance Test

At 60° C., charging the secondary battery to 4.25V at a constant current of 0.5 C, and then charging to the current of 0.05 C at a constant voltage, and testing a current volume of the secondary battery using a drainage method, and recording as $V_1$; and placing the secondary battery to a thermostat at 60° C., taking out after storing for 30 days, and testing a current volume of the secondary battery, and recording as $V_2$.

Volume expansion ratio (%) of the secondary battery after being stored for 30 days at 60° C.=$[(V_2-V_1)/V_1] \times 100\%$ (2) High-Temperature Cycle Performance Test At 45° C., charging the secondary battery to 4.25V at a constant current of 1 C, and then charging to the current of 0.05 C at a constant voltage of 4.25V, standing for 5 min, and discharging to 2.5V at a constant current of 1 C, which is a first charging/discharging cycle of the secondary battery; recording the discharge capacity of the secondary battery after the first cycle; and according to the aforesaid method, circularly charging/discharging the secondary battery for 800 times to obtain the discharge capacity after 800 cycles.

Capacity retention ratio (%) of the secondary battery after 800 cycles at 45° C.=(the discharge capacity of the secondary battery after 800 cycles/the discharge capacity of the secondary battery after the first cycle)×100%

TABLE 2

Performance Test Results of Embodiments 1-18 and Comparative Examples 1-5

| S/N | Volume expansion ratio (%) after being stored for 30 days at 60° C. | Capacity retention ratio after 800 cycles at 45° C. |
|---|---|---|
| Embodiment 1 | 18.7 | 87.3 |
| Embodiment 2 | 19.4 | 87.9 |
| Embodiment 3 | 21.5 | 88.6 |
| Embodiment 4 | 21.4 | 90.1 |
| Embodiment 5 | 17.4 | 86.9 |
| Embodiment 6 | 18.7 | 87.1 |
| Embodiment 7 | 19.5 | 88.1 |
| Embodiment 8 | 20.3 | 89.1 |
| Embodiment 9 | 18.9 | 89.1 |
| Embodiment 10 | 17.9 | 88.7 |
| Embodiment 11 | 14.8 | 84.9 |
| Embodiment 12 | 13.1 | 83.1 |
| Embodiment 13 | 17.1 | 86.6 |
| Embodiment 14 | 16.8 | 86.1 |
| Embodiment 15 | 15.3 | 87.9 |
| Embodiment 16 | 15.6 | 88.1 |
| Embodiment 17 | 15.1 | 90.1 |
| Embodiment 18 | 16.7 | 88.6 |
| Comparative Example 1 | 35.1 | 82.3 |
| Comparative Example 2 | 30.1 | 80.1 |

TABLE 2-continued

Performance Test Results of Embodiments 1-18 and Comparative Examples 1-5

| S/N | Volume expansion ratio (%) after being stored for 30 days at 60° C. | Capacity retention ratio after 800 cycles at 45° C. |
|---|---|---|
| Comparative Example 3 | 46.1 | 78.1 |
| Comparative Example 4 | 10.1 | 71.1 |
| Comparative Example 5 | 35.1 | 80.6 |

Analysis of the test results in Table 2 shows that the negative electrode active material of the secondary battery in Embodiments 1-18 comprises a silicon-based material, and the electrolyte comprises dimethyl carbonate and the additive shown in Formula 1. Thus, a lithium ion battery can have both good high-temperature cycle performance and high-temperature storage performance.

The electrolyte in Comparative Example 1 excludes dimethyl carbonate and the additive shown in Formula 1, so that the secondary battery has poor high-temperature cycle performance and poor high-temperature storage performance. The electrolyte in Comparative Example 2 comprises the additive shown in Formula 1 but excludes an organic solvent dimethyl carbonate, so that the secondary battery has poor high-temperature cycle performance. The electrolyte in Comparative Example 3 comprises dimethyl carbonate but excludes the additive shown in Formula 1, so that the lithium ion battery has poor high-temperature cycle performance and poor high-temperature storage performance. In Comparative Example 4, the high-temperature cycle performance of the secondary battery is seriously degraded when the content of the additive shown in Formula 1 included in the electrolyte is too high. In Comparative Example 5, the high-temperature storage performance of the secondary battery is obviously degraded when the content of the dimethyl carbonate included in the electrolyte is too high.

What is claimed is:

1. A secondary battery, comprising:
a negative electrode plate that comprises a negative electrode film, wherein the negative electrode film comprises a negative electrode active material;
electrolyte that comprises an electrolyte salt, an organic solvent and an additive, wherein
the negative electrode active material comprises a silicon-based material;
the organic solvent comprises dimethyl carbonate (DMC), ethylene carbonate (EC), and ethyl methyl carbonate (EMC), wherein a mass ratio of the dimethyl carbonate (DMC) in the organic solvent is ≤20%, a mass ratio of the ethylene carbonate (EC) in the organic solvent is ≤15%, a mass ratio of the ethyl methyl carbonate (EMC) in the organic solvent is 65%~95%; and
the additive comprises one or more of compound shown in Formula 1 below, wherein a mass ratio of the compound shown in Formula 1 in the electrolyte is ≤1%;

Formula 1 where, $R_1$ is selected from one or more of C2~C4 alkylene or halogenated alkylene, C2~C4 alkenylene or halogenated alkenylene, C6~C18 arylene and derivatives thereof.

2. The secondary battery according to claim 1, wherein the compound shown in Formula 1 is selected from one or more of the following compounds:

Compound 1

Compound 2

Compound 3

Compound 4

3. The secondary battery according to claim 1, wherein the mass ratio of the compound shown in Formula 1 in the electrolyte is ≤0.8%.

4. The secondary battery according to claim 1, wherein the mass ratio of the dimethyl carbonate (DMC) in the organic solvent is ≤10%.

5. The secondary battery according to claim 1, wherein the organic solvent conforms to at least two conditions in the following (1)~(2):
(1) the mass ratio of the ethylene carbonate (EC) in the organic solvent is ≤10%;
(2) the mass ratio of the ethyl methyl carbonate (EMC) in the organic solvent is 75%~95%.

6. The secondary battery according to claim 1, wherein the electrolyte salt comprises one or more of LiPFe and LiFSI.

7. The secondary battery according to claim 1, wherein a concentration of the electrolyte salt in the electrolyte is 1.05 mol/L~1.4 mol/L.

8. The secondary battery according to claim 1, wherein a conductivity of the electrolytic solution at 25° C. is 8 mS/cm~10 mS/cm; and/or,
a viscosity of the electrolytic solution at 25° C. is 3.5 mPa·s~5 mPa·s.

9. The secondary battery according to claim 1, wherein the silicon-based material comprises one or more of monatomic silicon, silicon-carbon composite, silicon oxide compound, silicon nitride compound and silicon alloy.

10. The secondary battery according to claim 1,
wherein the negative electrode active material further comprises a carbon material,
wherein the carbon material comprises one or more of synthetic graphite, natural graphite, hard carbon and soft carbon.

11. The secondary battery according to claim 1, wherein a press density of the negative electrode film is 1.6 g/cm$^3$~1.8 g/cm$^3$.

12. The secondary battery according to claim 1, wherein the secondary battery further comprises a positive electrode plate,
the positive electrode plate comprises a positive electrode current collector and a positive electrode film disposed on at least one surface of the positive electrode current collector and comprising a positive electrode active material, and
the positive electrode active material comprises one or more of lithium-nickel-cobalt-manganese oxides and lithium-nickel-cobalt-aluminum oxides.

13. The secondary battery according to claim 12, wherein the positive electrode active material further comprises one or more of lithium nickel oxides, lithium manganese oxides, lithium iron phosphate, lithium manganese phosphate, lithium manganese iron phosphate, lithium cobaltate and modified compounds thereof.

14. A device, comprising the secondary battery according to claim 1.

15. The secondary battery according to claim 12, wherein the positive electrode active material comprises one or more of $Li_aNi_bCo_cM_dM'_eO_fA_g$ or $Li_aNi_bCo_cM_dM'_eO_fA_g$ with a coating layer coated on at least a part of surface of the $Li_aNi_bCo_cM_dM'_eO_fA_g$,
wherein $0.8 \leq a \leq 1.2$, $0.5 \leq b < 1$, $0 < c < 1$, $0 < d < 1$, $0 \leq e \leq 0.1$, $1 \leq f \leq 2$, and $0 \leq g \leq 1$, M is selected from one or more of Mn and Al, M' is selected from one or more of Zr, Al, Zn, Cu, Cr, Mg, Fe, V, Ti and B, and A is selected from one or more of N, F, S and Cl.

* * * * *